US012730863B2

(12) United States Patent
El Boudi et al.

(10) Patent No.: US 12,730,863 B2
(45) Date of Patent: Sep. 8, 2026

(54) ACCESS CONTROL TO A SET OF APPARATUSES HAVING SCREENS

(71) Applicant: UNIVERSITÉ GRENOBLE ALPES, Saint Martin d'Hères (FR)

(72) Inventors: Islam El Boudi, Grenoble (FR); Nicolas Vuillerme, Saint Martin d'Hères (FR)

(73) Assignee: UNIVERSITÉ GRENOBLE ALPES, Saint Martin d'Heres (FR)

( * ) Notice: Subject to any disclaimer, the term of this patent is extended or adjusted under 35 U.S.C. 154(b) by 55 days.

(21) Appl. No.: 18/844,933

(22) PCT Filed: Mar. 7, 2023

(86) PCT No.: PCT/IB2023/052141
§ 371 (c)(1),
(2) Date: Sep. 6, 2024

(87) PCT Pub. No.: WO2023/170575
PCT Pub. Date: Sep. 14, 2023

(65) Prior Publication Data

US 2025/0217457 A1 Jul. 3, 2025

(30) Foreign Application Priority Data

Mar. 8, 2022 (FR) ....................................... 2201978

(51) Int. Cl.
*G06F 21/12* (2013.01)
*G06F 11/34* (2006.01)

(52) U.S. Cl.
CPC ........ *G06F 21/121* (2013.01); *G06F 11/3438* (2013.01); *G06F 2201/865* (2013.01)

(58) Field of Classification Search
None
See application file for complete search history.

(56) References Cited

U.S. PATENT DOCUMENTS 7,036,145 B1 4/2006 Murphy et al.
2010/0076274 A1* 3/2010 Severson .............. G06F 16/435 707/E17.127

(Continued)

FOREIGN PATENT DOCUMENTS

CN 105912944 B 11/2018
EP 2574090 A1 3/2013

OTHER PUBLICATIONS

International Search Report w/English translation for PCT/IB2023/052141, mailed Jun. 7, 2023, 6 pages.

(Continued)

*Primary Examiner* — Syed A Roni
(74) *Attorney, Agent, or Firm* — NIXON & VANDERHYE

(57) ABSTRACT

A system for controlling the use of screens by a user comprises a set of software modules each embedded in an apparatus of a set of apparatuses of the user. The set of apparatuses comprises screens, and a server connected to the apparatuses by a telecommunication network, wherein: the apparatuses are initially restricted to a first set of functions, and include determining behavioral information of the user and transmitting same to the server, and the server is adapted for granting an additional function according to the behavioral information, and for transmitting, to the software module of a selected apparatus, a message to enable the user to access the additional function.

14 Claims, 3 Drawing Sheets

(56) References Cited

U.S. PATENT DOCUMENTS

2014/0136607 A1 5/2014 Ou et al.
2015/0180908 A1 6/2015 Dang et al.

OTHER PUBLICATIONS

Written Opinion of the ISA w/English translation for PCT/IB2023/052141, mailed Jun. 7, 8 pages.
French Preliminary Search Report and Written Opinion w/English translation for FR 2201978, dated Oct. 1, 2022, 11 pages.
Mireia Adelantado-Renau et al., "Association Between Screen Media Use and Academic Performance Among Children and Adolescents", JAMAPediatrics, Sep. 23, 2019, 10 pages.
Jeroen S. Lemmens et al., "Development and Validation of a Game Addiction Scale for Adolescents", Taylor & Francis Online, Nov. 7, 2007, 5 pages.
Şahin Gökçearslan et al., "Modelling smartphone addiction: The role of smartphone usage, self-regulation, general self-efficacy and cyberloafing in university students", Computers in Human Behavior, vol. 63, Nov. 24, 2015, 11 pages.
Zubair Ahmed Ratan et al., "Smartphone Addiction and Associated Health Outcomes in Adult Populations: A Systematic Review", International Journal of Environmental Research and Public Health, Nov. 22, 2021, 17 pages.
Shiri Prizant-Passal et al., "Social anxiety and internet use—A meta-analysis: What do we know? What are we missing?", ScienceDirect, vol. 62, Sep. 2016, 7 pages.
Lutz Wartberg et al., "The relevance of emotion regulation, procrastination, and perceived stress for problematic social media use in a representative sample of children and adolescents", Computers in Human Behavior, vol. 121, Mar. 20, 2021, 7 pages.
Min Kwon et al., "The Smartphone Addiction Scale: Development and Validation of a Short Version for Adolescents", PLoS One, Dec. 31, 2013, 17 pages.
Carolyn A Lin, "Unregulated Internet Usage: Addiction, Habit, or Deficient Self-Regulation?", Media Psychology, vol. 5, Jan. 2003, 31 pages.

* cited by examiner

[Fig. 1]
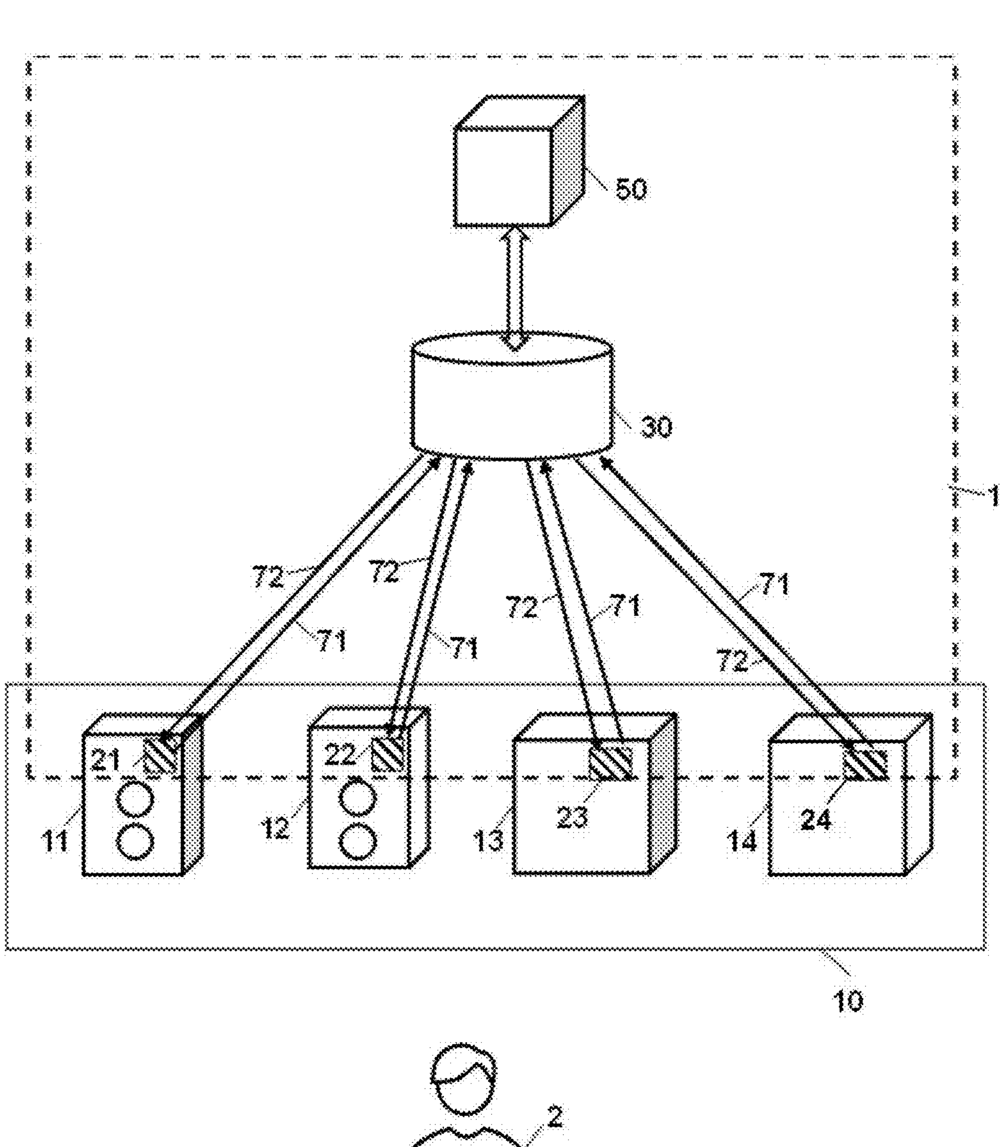

[Fig. 2]
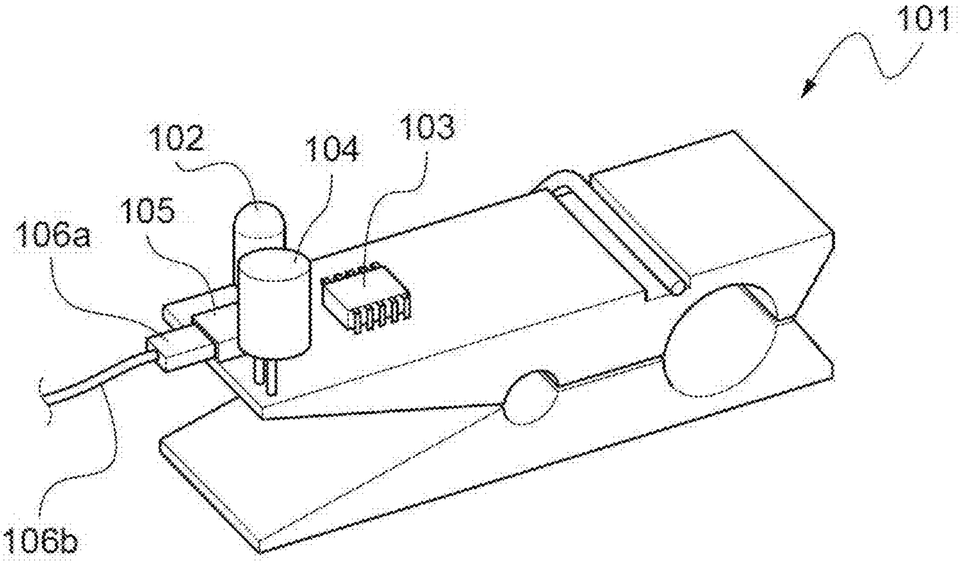
[Fig. 3]
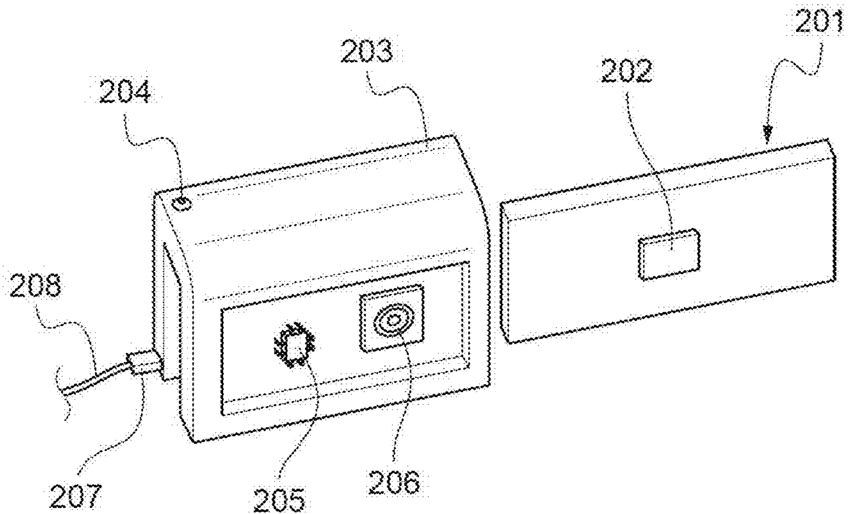

[Fig. 4]
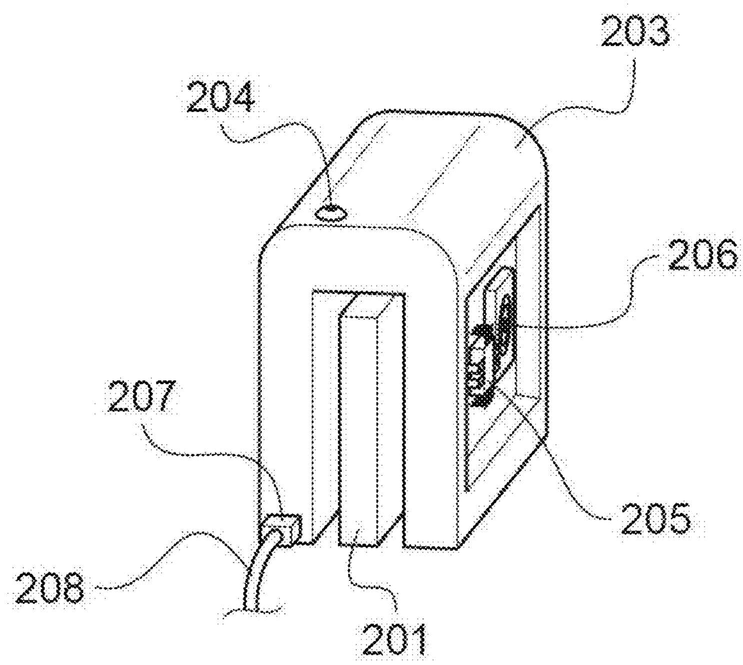

ACCESS CONTROL TO A SET OF APPARATUSES HAVING SCREENS

CROSS-REFERENCE TO RELATED APPLICATIONS

This application is the U.S. national phase of International Application No. PCT/IB2023/052141 filed Mar. 7, 2023 which designated the U.S. and claims priority to FR 2201978 filed Mar. 8, 2022, the entire contents of each of which are hereby incorporated by reference.

FIELD OF THE INVENTION

The present invention relates to the control of the access of users to apparatuses having screens. The invention applies in particular to the therapy of users suffering from disorders related to the use of apparatuses with screens, and in particular of a moderate use, a dependence, or an addiction on screens, defining a degree of digital lifestyle.

The degree of digital lifestyle is a characterization of the impact of screens on a user's health. Such characterization is a continuum that extends from moderate use to problematic use. The problematic use of screens can be observed in several cases:

- when the recreational use of screens has become the only activity of a user during his waking time,
- when the user sacrifices aspects of his social life in favor of the recreational use of screens (schooling, professional situation, situations relating to family or friends),
- when the user's health is endangered due to the use of screens (sedentary lifestyle, sleep, social isolation, depression).

CONTEXT OF THE INVENTION

The excessive use of screens is now recognized as a major problem in our society. Furthermore, the global pandemic that began in 2020 led individuals to confine themselves for several months and intensified both the behaviors of dependence on screens and the number of scientific and political reflections around the issue.

In France, MILDECA (*Mission Interministérielle de Lutte contre les Drogues et les Conduites Addictives* [Inter-ministerial mission to combat drugs and addictive behaviors]) issued a report in 2021 stating that 24% of young French people being 15-24 years old report watching videos more than 4 hours a day and 33% of young people play online games the same number of hours each day.

However, an excessive use of screens (e.g. smartphones, Internet, online games) causes many consequences that can be dramatic for the health and cognitive development of adolescents and young adults. Indeed, the difficulty in regulating the use of screens can lead to serious pathological disorders such as an addiction to video games.

Recent results have shown that regular exposure to television set or video games is associated with fewer positive attitudes toward school and with lower academic performance. We can notably cite Adelantado-Renau et al., "Association Between Screen Media Use and Academic Performance Among Children and Adolescents: *A Systematic Review and Meta-analysis*", 2019, DOI: 10.1001/jamapediatrics.2019.3176.

This can be explained in particular by the fact that excessive use of screens is also linked to weaker cognitive skills such as a weak perception to self-regulate, as explained e.g. in Gökçearslan et al., "*Modeling smartphone addiction: The role of smartphone usage, self-regulation, general self-efficacy and cyberloafing in university students*»in Computers in Human Behavior, 2016, DOI: 10.1016/j.chb.2016.05.091, or LaRose et al., «<Unregulated Internet Usage: Addiction, Habit, or Deficient Self-Regulation?" in Media Psychology, 5(3), 225-25, 2003.

Wartberg et al., "*The relevance of emotion regulation, procrastination, and perceived stress for problematic social media use in a representative sample of children and adolescents*" in Computers in Human Behavior, vol. 121, 2021, also links the excessive use to more inattention.

Furthermore, an excessive use of screens is associated with poorer sleep quality, e.g. according to Chen & Gau., "*Sleep problems and internet addiction among children and adolescents: a longitudinal study*", in Journal of Sleep Research, 2016, or Ratan et al., "*Smartphone Addiction and Associated Health Outcomes in Adult Populations: A Systematic Review*", in International Journal of Environmental Research and Public Health, 2021, and also with lower self-esteem, with greater anxiety and with more depression, as discussed in Prizant-Passal et al., "*Social anxiety and internet use-A meta-analysis: What do we know? What are we missing*?", in Computers in Human Behaviors, vol. 62, 2016, or in the aforementioned article of Ratan et al.

The aim of the invention is to propose technical means to assist in the therapy of user suffering from psychological disorders related to excessive use of screens (computers, mobile phones, game consoles, television sets, etc.).

Such disorders include the dependence on (or addiction to) screens as described hereinabove, and also related or correlated disorders such as sedentary lifestyle, social isolation, school or professional dropout, depression, etc.

EP2574090A1 describes methods and systems for managing mobile device applications according to the prior art.

SUMMARY OF THE INVENTION

The present invention aims to provide a mechanism for controlling access to the set of apparatuses having screens that a same user may have, in a global manner, and not in an apparatus by apparatus manner.

Furthermore, according to embodiments, the invention aims to provide assistance to users with respect to their dependence, by encouraging them to adopt an adequate behavior with respect to screens, in particular by taking into account specific aspects of their dependence.

To this end, according to a first aspect, the present invention can be implemented by a system for controlling the use of apparatuses having screens by a user, comprising a set of software modules, each embedded in an apparatus of a set of apparatuses comprising screens of said user, and a server connected to said apparatuses by a telecommunication network, wherein:

- said apparatuses are initially restricted, at the beginning of a first time period, to a first set of functions, by means of said software modules and include means for determining behavioral information of said user and for transmitting said behavioral information to said server; and
- said server is adapted for granting an additional function among a second set of functions of said apparatuses according to said behavioral information, and for transmitting, to the software module of a selected apparatus of said set of apparatuses, a message to enable said user to access said additional function.

According to preferred embodiments, the invention comprises one or more of the following features which may be used separately or in partial combination with each other or in full combination with each other:

- said additional functional is determined according to a degree of digital lifestyle of said user.
- the system is intended for pre-defining activities for said user according to said degree of digital lifestyle of said user, and said behavioral information depends on said activities;
- said degree of digital lifestyle is established by aggregating measurements from said software modules, said measurements comprising first measurements about the behavior of the applications installed on said apparatuses, and second measurements about the behavior of said apparatuses;
- said software modules are adapted for detecting a bypassing of the restriction by said user;
- the system is adapted for checking the relevance of content of said behavioral information;
- said software modules are adapted for checking that same are continuously in operation;
- said additional function is limited to a second time period, substantially shorter than the first time period.
- said behavioral information comprises one element among a spatial movement of said user measured by an apparatus, a physical activity measured by an apparatus, the use of communication tools measured by an apparatus, the visualization of educational content measured by an apparatus, the taking of a photo measured by an apparatus, the reproduction of educational information, the validation by a third party, the validation by an external apparatus;
- at least one software module among said set is embedded in an electrical plug supplying power to an apparatus of said set of apparatuses;
- said software module embedded in said electrical plug is adapted for detecting a connection or a disconnection of said plug.
- said selected apparatus is determined by said user through a human-machine interface;
- said additional function is determined by said user through a human-machine interface;
- said additional function is determined based on a characterization of a type of behavior disorder of said user.

According to a second aspect, the invention can also be implemented by a method for controlling the use, by a user, of apparatuses having screens, including the arrangement of a set of software modules, each embedded in an apparatus of a set of apparatuses having screens of said user, and of a server connected to said apparatuses by a telecommunication network,

- an initial restriction of said apparatuses, at the beginning of a first time period, to a first set of functions, by means of said software modules, and
- said software modules determine behavioral information of said user and transmit said behavioral information to said server;
- and the granting, by said server, of an additional function among a second set of functions of said apparatuses according to said behavioral information, and the transmission, to the software module of a selected apparatus of the set of apparatuses, of a message to enable said user to access said additional function.

According to one embodiment, the set of software modules communicate via the telecommunication network with a smart contract in which the initial restriction of said apparatuses and the degree of digital lifestyle of said user are defined, allowing each additional function to be unlocked, each software module unlocking an additional function automatically when the corresponding degree of digital lifestyle defined in the smart contract is reached by the user. In the event of the therapist's absence or unavailability, the user can thus see his functions unlocked automatically, by exchange of information between the software modules and the smart contract, which is understood in the context of the present invention as any computer protocol which facilitates, verifies and executes the negotiation or execution of a contract, implemented in particular on a blockchain.

Other features and advantages of the invention will appear upon reading the following description of one preferred embodiment of the invention, given only as an example, and in reference to the appended drawings

BRIEF DESCRIPTION OF FIGURES

The Appended Drawings Illustrate the Invention:

FIG. 1 schematically represents an example of architecture according to one embodiment of the invention.

FIG. 2 is a schematic view of a device for assuring the state of connection;

FIG. 3 is a schematic view of a game console and of a device for assuring the state of use of a game console in a first position;

FIG. 4 is a schematic view of the game console and of the device of FIG. 3 in a second position.

DETAILED DESCRIPTION OF EMBODIMENTS OF THE INVENTION

One of the goals of the invention is to control the access to the different apparatuses having a screen, that a user may possess. The goal is both to prevent excessive behavior from a user suffering from dependence on screens or associated disorders, but also to arrange a remote therapy and guide same toward an improvement of the condition of the user or even toward a cure.

Disorders related to screen use include addiction (or dependence), social isolation, school or professional dropout, sedentary lifestyle, depression.

Such disorders can manifest at home or outside, in particular via mobile phones such as smartphones. Preferentially, all the apparatuses of a user has to be controlled.

FIG. 1 illustrates an architecture according to an embodiment of the invention.

A user 2 has a fleet 10 of apparatuses which has screens and which can, thus, as such, contribute to the potential disorders related to the screen use, for the user 2.

Generally Speaking, these Apparatuses can be Divided into Two Categories:

- information processing apparatuses, 13, 14, which enable a software module 23, 24, respectively to be embedded; and
- other apparatuses (not shown) which do not allow such software modules to be embedded.

Among the first type of apparatuses, mention may be made in particular of mobile telecommunication terminals (such as a smartphone), or other terminals equipped with a screen having an interface allowing for the installation of an ad-hoc software module such as e.g. digital tablets, computers, connected watches, virtual reality headsets, etc.

Among the second type of apparatuses, mention may be made in particular of television sets, game consoles, etc. Such apparatuses generally do not have interfaces serving for the installation of an ad-hoc software module.

For this second type of apparatuses, the invention provides embedding a software module in an electrical plug supplying power to this apparatus.

Such a plug may have a software infrastructure and interfaces enabling software modules to be installed.

Indeed, the development of connected objects, making it possible to support the Internet of things (IoT), has led to the availability of many plug solutions making possible advanced functions and/or providing ways to embed additional functions via additional software modules.

An example of such plugs is e.g. same developed by the company SHELLY. The Shelly Plugs natively provide consumed power measurement functions and interfaces, or APIs (Application Programming Interface) allowing to access to the made measurements and to export same to devices external to the plug.

The interface of the plugs of the company Shelly is described e. g. at the website of Shelly API Documentation.

According to one embodiment, a plug or a multiple plug, or a PDU (Power Distribution Unit), can be used. In such an embodiment, the software modules 21, 22 serve to individually manage each of the plugs of the multiple plug (i.e. to control the access to the functions of the apparatus power-supplied by each plug).

According to one embodiment of the invention, the electrical plug is apt to collect a particular measurement in the event of physical disconnection of a power-supplied apparatus, thereby allowing a detection of the disconnection.

More particularly, the electrical plug 11, 12 may be suitable for not permitting the disconnection of an apparatus without the detection of the disconnection by a respective probe 21, 22. The probe can detect the disconnection state by different types of sensors, such as e.g.: electric current sensor, temperature sensor, accelerometric and spatial sensor, distance sensor, microswitch, pressure sensor, proximity sensor, voltage sensor, infrared sensor, shock sensor or motion sensor.

To this end, one embodiment consists in arranging the electrical plug so that, when the (male) plug of the apparatus is physically disconnected from the (female) plug, the electrical plug is no longer supplied with power. For example, the plug housing 11, 12 is encapsulated in a top housing that confines the (male) plug connected by cord to the power-supplied apparatus, so that the plug cannot be disconnected without at least partially removing the top housing. The latter can be arranged so that the removal thereof, even partial, also requires disconnecting the power supply from the plug housing 11, 12. Consequently, the absence, even momentary, of power supply can be detected simply by interrogating the software modules 21, 22.

The challenge is that the control of the plug by a given software module effectively controls an associated power-supplied apparatus.

For this purpose, it is necessary to guarantee an unequivocal link between a given plug and an associated apparatus, and hence to prevent a user from connecting one particular apparatus to another (possibly unmonitored) plug or from connecting another apparatus to the given monitored plug.

For example, this embodiment makes it possible to prevent a user from disconnecting his/her game console from the monitored plug 11, 12 in order to connect same to another plug in his/her home. The result would obviously be that the access control would lose the precision thereof and that the therapy mechanism would lose the effectiveness thereof.

Thereby, embedding software modules in the electrical plug(s), supplying power to an apparatus, indirectly leads to controlling access to same.

In a variant of the detection of the electrical consumption of the power-supplied apparatus, FIG. 2 schematically illustrates another device 101 in the form of a clamp, serving to assure the state of connection between the male plug and the female plug of an apparatus. The device 101 is clamped on the cable (not shown) of the power cord of the apparatus. Indeed, to disconnect the male plug from the female plug, the user has to exert a force on the male plug. The device 101 is apt to measure that a disconnection force has been applied along the cord of the male plug. This force needed for the disconnection of the apparatus causes a direct warning (luminous) signal on a light emitting diode (LED) 102 and/or a sending of data to servers (not shown). The device 101 comprises, in this illustrative and non-limiting embodiment, a microprocessor 103, a movement sensor 104 and a connector 105 for receiving a plug **105*a* connected to a cable 105*b*, used to transfer data from the device 101 to servers and to supply power to the device 101. Any other means of data transmission can however be envisaged in the context of the invention (Bluetooth signal, WiFi, LoRa, Sigfox, sound signal, sending SMS, vibrations, etc.). The device 101 can e.g. be implemented with an Arduino Nano® system. When the device 101 is clamped on a power cable of an apparatus to be monitored, any disconnection of the apparatus creates a sudden movement on the power cable thereof, detected by the device 101**.

The motion sensor can be any sensor apt to detect a movement at the cord where the clamp is attached (tilt ball sensor, accelerometer, gyroscope, pressure, piezoelectric, light divergence, vibration).

It is of course understood that the mode of attachment of the device 101 at the cable is not necessarily a clamp. The device 101 can be attached by any other means allowing the movements of the cable to be followed in a secured manner.

In the case where the motion sensor is an accelerometer, the algorithm to detect an attempt to disconnect an apparatus to be monitored is as follows:

initial state of the position sensor (X1, Y1, Z1)
motion/shock detection
delay (e.g. 45 seconds)
reading of the position sensor (Xi, Yi, Zi)
if at least one of the coordinates (Xi, Yi, Zi) differs by more than 10% from the coordinates (X1, Y1, Z1), detecting an attempt to disconnect, otherwise false alarm (simple movement of the apparatus to be monitored).

FIGS. 3 and 4 schematically illustrate another device 203 serving to assure the state of use of a game console or a tablet computer 201.

The apparatus considered herein is a flat apparatus, such as a game console or tablet computer 201, which is equipped with an RFID chip 202 stuck to the rear side of the game console or tablet computer 201.

The device 203 is in the form of a pedestal having the shape of a narrow elongated arch, defining a space for receiving the game console or table computer 201.

The device 203 comprises an LED 204, a processor 205, an RFID sensor 206, and is supplied with power by a plug 207 connected to a cord 208, the plug 207 and the cord 208 making possible both to supply power to the device 203 and to transfer data from/to the device 203.

In the position shown in FIG. 3, the game console or tablet computer 201 is outside the receiving space of the device 203, so the RFID chip 202 of the game console or tablet computer 201 is not detected by the RFID sensor 206: it is then assumed that the game console or tablet computer 201 is in use.

In the position shown in FIG. 4, the game console or tablet computer 201 is in the receiving space of the device 203, so the chip RFID 202 of the game console or tablet computer 201 is detected by the sensor RFID 206: the game console or tablet computer 201 is then not in use.

When the processor 205 detects the presence of the chip 202 attached to the game console or tablet computer 201, the processor 205 sends to a server (not shown) according to a determined period, e.g. every minute, an incremental amount of non-use of the game console in a time-stamped manner (e.g. using a set of three parameters: {"TimeNotinUse": 256, "FirstDetectionTime": "8:45 am", "FirstDetectionTime": "8:30 pm"}), except in the case where the user has unlocked time on the game console or tablet computer 201.

In addition, when restrictions on the use of the game console or tablet computer 201 are to be applied, the luminous signal of the LED differs in the case where the user can use the game console or tablet computer and in the case where the user cannot use same, e.g. the LED turns on when the user can use the portable game console and the LED 204 turns off when the user cannot use the game console or tablet computer 201.

If the user decides to use the game console or tablet computer 201 when the user does not have the right to use screens, the device 203 sends data to a server in order to implement an alert.

It is possible to use other transmitters apt to transmit usage information when the user is not authorized to use the portable game console or tablet computer (e.g.: Bluetooth signal, sound signal, WiFi signal, LoRa, Sigfox, sending SMS, vibration).

The devices 101 and 203 thus allow to know the state of use of the apparatuses supplied with power by a power cord and of game consoles or tablet computers.

In the case of information processing apparatuses 13, 14 having interfaces and means for this purpose (desk or laptop computers, digital tablets, mobile phones such as smartphones, connected watches, virtual reality headsets, etc.), the software modules 23, 24 can be deployed directly. These software modules have to be suitable for the type of apparatuses and in particular to the used operating system.

Generally speaking, the software modules are installed to be launched when the user opens a session on the apparatus and to operate continuously in background, in order to collect real-time measurements about the user's activities and to control access to the functions of the apparatus. When the apparatus does not support multiple sessions, the opening of a session for the user is equivalent to turning on the apparatus.

For example, on a computer running on the Windows® operating system, the software module is placed in the directory:

Users/<user_name>/AppData/Roaming/Microsoft/Windows/Start Menu/Programs/Startup wherein <user_name> is the user's name as registered in the Windows® operating system (corresponding to the user's session).

Thereby, at each opening of its Windows® session, the software module will be automatically executed.

Furthermore, the software module can be a program in Python® language, and be stored in the apparatus in the form of a ".pyw" file. As a result, the software module can be considered as a service, so as not to be detected as a software with a visible user interface, and so as to make more difficult its detection and its closing by the user.

In the same way, on an apparatus running with an Mac OS® system of the company Apple®, the software module can be stored in the directory:

~/Library/Launch Daemons/

In this way, the software module is automatically executed when the apparatus is started.

Likewise as well, the software module can be a program in Python® language, and be stored in the apparatus in the form of a ".pyw" file. As a result, the software module can be considered as a service, so as not to be detected as a software, and so as to make more difficult its detection and its closing by the user.

Moreover, access to the functions formed by certain websites can be controlled by the configuration files of web browsers. For example, the "host" file can be used for blocking websites by domain name.

On an apparatus such as a tablet computer or a telecommunication terminal, the software module can be a launcher in order to be automatically executed when the apparatus is started.

This software module (or application) can be declared via the Android® intent mechanism to respond to the "home" and "default" actions:

<category android: name="android.intent.category.DEFAULT"/>

<category android: name="android.intent.category.HOME"/>

The background services mechanism is used for a continuous analysis of the apparatus and for blocking access to certain resources and functions.

The foreground service mechanism is used to indefinitely maintain the service in background.

The system service "Usage_stat_service" is used to analyze the open applications and to bring the software module back to the foreground if needed.

On an apparatus running with an iOS operating system of the company Apple® or with an Android® operating system, the MDM (Mobile Device Management) tool can be used to put the apparatus into a supervised mode and to allow a continuous analysis of the phone and to block access to certain functions.

According to the invention, the apparatuses 11, 12, 13, 14 are initially restricted, at the beginning of a first time period, to a first set of functions, by means of the software modules 21, 23, 23, 24.

The term "restricted" means that only this first set of functions is accessible to the user. In a way, the apparatus thus adopts a degraded operation. This restriction may correspond to authorizing only a predefined list of software applications identified as not problematic for the user on each apparatus, e.g.: alarm clocks, word processor, management of telephone audio calls, camera, management of video conferences, listening to music, searching for documentation on the Internet, etc.

In some cases, the set of functions for an apparatus may be empty. This is particularly the case for certain apparatuses for which an "On/Off" operation can be adopted. For example, for a game console, or a television set, it can be simply decided whether to permit access or not, without more granularity on the right of access. If such type of apparatuses is controlled by a software module embedded on the electrical plug that supplies power to it, the "On/Off" operation corresponds directly to the control of the electrical supply by this software module.

The time period may e.g. correspond to one day.

According to the invention, at the beginning of the (first) time period, the apparatuses are limited to a first set of functions. As will be seen, the accessible functions may evolve over time, then, at the beginning of the following period, the functions are again restricted to this first set of functions.

The first set of functions corresponds to functions of the apparatuses that normally do not cause pathological disorders and/or are necessary to the user for certain reasons (professional in particular).

These restricted functions may correspond to minimum functions for each apparatus. For example:

smartphone=calls, messages, clock/alarm clock, camera, photo gallery, music, microphone, calendar, notes, calculator, mapping, file manager tablet computer=clock/alarm clock, camera, photo gallery, music, microphone, calendar, notes, calculator, mapping, file manager computer=internet searches (excluding social networks, video streams ("streaming"), online games), office applications (example: word processor, presentations, spreadsheet), video conferencing video game console & television sets=binary access: either everything is cut off, or all the functions are given.

This pre-identified list of non-problematic software applications on each apparatus can be modulated by human or software decisions. For example, the user's therapist may allow the "Tous anti covid" application to be permanently opened if the user considers that this does not represent a potentially problematic use. A software may also decide to grant access to certain other softwares if same do not represent a potentially problematic use for the user based on the user's usage data.

The software modules can thus be used to control access to the different functions of the apparatuses. To this end, the software modules can:

record authorized or prohibited resources in lists used by certain applications (e.g., list of websites in the "host" file as explained hereinabove), intercept access requests (application launching, etc.) and authorize or not authorize same, etc.

According to one embodiment, the system is designed to detect an attempt by the user to bypass the restriction, in order to ensure that the latter is permanently in the user path.

More particularly, the different software modules can be adapted to detect a bypassing of the restriction by the user.

For example, as previously described, the software modules embedded in the electrical plug(s) can detect a connection or a disconnection of the power supply (made necessary to connect/disconnect an apparatus). This detection is made possible by the server by the transmission of a particular signal by the software modules (e.g. when the plug is supplied with power again), or by the absence of transmission for a certain predefined period, e.g. after thirty seconds.

In the case of an apparatus running on an iOS MDM system, it is only possible to exit the restricted profile by using a confidential password or by accessing the administrator file and executing an adb (Android Debug Bridge) command.

According to one embodiment, the software modules are suitable for verifying that same are continuously in operation. This verification can be implemented in different ways, depending on the type of apparatus and of operating system.

In the case of an apparatus running on Android, the software modules can continuously verify that the default application ("launcher") corresponds to a software module according to the invention. If the default application is different, then a bypassing attempt has been made.

In the case of an apparatus running on a Microsoft Windows or MacOS system, two services may communicate continuously. If a service is closed through the task manager, an attempt has been made to close the service, and the twin service can then deny access to the task manager Furthermore, the apparatuses are suitable for determining behavioral information of the user and transmit same, via a message 71, to the server 50.

This behavioral information can be measured by these software modules. In the same way that these software modules can control access to the functions of an apparatus, these software modules can also access different parameters of that apparatus or applications deployed on same.

The behavioral information can be stored in a database 30 where the server can retrieve same. This database can be remote and thereby accessible and shared for all the apparatuses.

The transmission of the behavioral information is performed via the telecommunication network to which the apparatus is connected.

It is thereby possible to decorrelate the pacing for relaying the behavioral information and the pacing of the server. In particular, the behavioral information can be determined in real-time, near-real-time, or in a time that depends directly on the nature of the behavioral information, whereas the server can operate at a different time pacing, or e.g. when same receives a request from the user.

The behavioral information may e.g. comprise one element among a movement in space of said user measured by an apparatus such as a mobile telecommunication terminal, a physical activity measured by an apparatus, the use of communication tools, the visualization of educational content, etc.

The behavioral information can be mapped to user activities that are associated with a "healthy" behavior, i.e. contributing to the user's fight against his disorder related to the use of screens, or at least not contributing to this disorder.

Thereby, the software modules can be suitable for measuring and transmitting behavioral information that corresponds to certain user activities.

These activities can be defined beforehand, during a diagnosis phase.

In particular, the activities may depend on a degree of digital lifestyle (or degree of dependence on screens) and/or a characterization of a behavior disorder of the user.

The degree of digital lifestyle is a quantification of the use of screens (or more precisely of apparatuses having screens).

The categorization aims to determine one or more categories of the disorder related to the use of screens, such as dependence (or addiction), social isolation, sedentary life, depression, school or professional dropout, etc. These different types of disorders are obviously linked since a strong dependence on screens is likely to lead to other pathologies.

Indeed, the disorder, or pathology, related to the use of screens can have particular aspects from one user to another, and this categorization can be used to influence the methodology to be implemented.

The degree of lifestyle, and the possible characterization of a behavioral disorder of the user can be determined in different ways.

In a manner known per se, provision may be made for users to fill in a questionnaire in order to establish a diagnosis making it possible to determine such parameters.

According to one embodiment of the invention, a degree of digital lifestyle can be established by aggregating measurements from the software modules embedded in the different information processing apparatuses 11, 12, 13, 14. The Measurements May Comprise first measurements about the behavior of the applications installed on said information processing apparatuses, and second measurements about the behavior of said information processing apparatuses.

These measurements can be transmitted to a database 30 to be stored therein.

The server 50 can periodically determine an aggregation of these measurements and a degree of digital lifestyle according to said aggregation.

More particularly, at least one probe 21, 22 may be provided, embedded in the one or more electrical plugs 11, 12 and suitable for collecting third measurements about the electrical behavior of the apparatus(es) power-supplied by these plugs.

The server is further suitable for determining the aggregation according to these third measurements.

Other ways to determine the degree of digital lifestyle, and the user's behavior regarding apparatuses with screens, are obviously possible.

Thereby, depending on the degree of this disorder, different activities (or "missions") may be requested to the user. Similarly, different activities, or missions, can be requested depending on a characterization of the user's dependence.

For example, a user whose dependence on screens negatively affects social relationships (social isolation disorder) may be assigned the task of making phone or video conference calls to authorized contacts such as a family member or close friend in order to increase socialization.

A user whose use of screens leads to too much sedentary life may be assigned as a mission a geographical displacement or a number of steps to perform.

Of course, the consequences of excessive use of screens being cumulative, the missions can be multiple and belong to several categories.

The software modules can access different resources, circuits, applications, etc. of the apparatus (including GPS, accelerometer, camera, pedometer, microphone, etc.) or any object or tool that can communicate with the apparatus such as a connected watch or virtual reality headset.

The software modules can thereby detect and measure the activities performed by the user, and determine whether and when the user has performed the requested activity, or mission, based on objective data in addition to declarative data that can be provided by the user himself or a third party.

The server 50 can, possibly in collaboration with the database 30, thereby determine whether a mission has been accomplished by the user on one of his apparatuses.

In addition, the system can be suitable for verifying the semantic relevance of these behavioral information, i.e. to verify that the missions validated by the system really correspond to the statements. The purpose is thereby to detect whether an attempt to bypass the restriction has been made, in particular by verifying whether the behavioral information truly correspond to a requested mission.

To this end, different types of algorithms can be deployed.

For example, if one of the proposed missions is to walk outside a perimeter of 400 meters, and the distance measured from one measurement to another (taken every 5 seconds) is greater than 25 meters, it can be automatically estimated that the user uses a means of locomotion other than walking, by going at a speed greater than 18 km/h. In addition, in a mission where the user is offered to take a picture of a cooked dish, an image recognition algorithm such as CNN (convolutional neural network) analyzes whether the dish does not correspond to another scenario (example: taking a picture of a tree) and thus corresponds indeed to the imposed mission. It may be provided that, in such case of suspicion by the algorithm, the picture is sent to a third party (e.g. to the therapist or to a parent) for human verification.

In general, the server can grant at least one additional function according to the behavioral information transmitted by the apparatuses 11, 12, 13, 14.

An activity that can be proposed to the user to unlock digital time can be e.g. in the form of a challenge consisting in calling a close relation (grandmother, aunt, friend). When the smartphone starts such activity, a countdown timer is started, and after a certain predetermined time period, the smartphone measures whether the phone application is still open and whether the microphone has been activated regularly during said time period in order to validate the challenge and to unlock digital time.

Apart from the digital time allocated as a reward when a user performs an activity measured by the sensors of the smartphone, the system and the method of the invention further propose to the user the opportunity to earn other rewards (cosmetic virtual content on other applications and video games appreciated by the user, such as e.g. skins, or discounts for other brands).

According to one embodiment, the system can propose evolutionary therapy: at the beginning, recreational activities or activities deemed problematic for the user (i.e. not included in the first set of functions) are blocked as long as a mission is not accomplished. The user thereby unlocks the recreational activities progressively as missions are accomplished. The status of the user can evolve to access the recreational activities without having to accomplish a specific mission. If the system, or a therapist, notices that the user is not yet autonomous and falls back into an addictive phase where he no longer does any activity and has an excessively or exclusively screen-oriented occupation, the initial restrictions will be applied again (the recreational activities can be blocked again as long as a mission is not completed).

More particularly, the server may determine whether a mission has been accomplished based on the behavioral information, and then infer the additional recreational function to be granted.

Such function may correspond to the accomplished mission, in the case where a plurality of missions have been set, each associated with one or more additional functions.

This additional function is chosen from a set of functions distinct from the first set corresponding to the restricted operations of the apparatuses.

The proposed set of functions can depend on different parameters, such as a degree of dependence and/or a characterization of the dependence of the user.

Thereby, according to embodiments, the granted additional function is determined (in particular) according to a degree of dependence and/or a characterization of a type of dependence of said user.

Such additional function forms a "credit" granted to the user. The latter may choose certain terms of use of his credit.

For example, the user can choose a function from the set of functions granted or proposed by the server.

This set of functions may comprise all or part of the functions not belonging to the first set of functions, corresponding to the restricted operation of the apparatuses.

In particular, these functions comprise game applications, access to video game consoles, to television sets, to video streaming applications, etc.

This set of functions can be presented by means of a human-machine interface: a list is presented and the user has means to select an element from this list that corresponds to the chosen additional function.

Provision may also be made for the user to be able to choose the apparatus on which he wishes to access the additional function, as long as a same function may be accessible on several apparatuses.

According to another embodiment, the selection and launch of an additional function on a given apparatus constitutes an access request and initiates a request to the server. The latter can then grant or not grant the access depending on whether the additional function belongs to the set of unblocked functions. The determination of the additional function and the choice of the apparatus are, in such case, implicit.

Moreover, according to a preferential embodiment, the additional function is limited to a (second) time period, substantially shorter than the (first) time period mentioned hereinabove.

Such time period may depend on the type of mission accomplished by the user, a degree of success, etc. For example, different thresholds can be set.

For example, a mission relating to a displacement measured by a number of steps, can serve to unlock an additional function for a duration proportional to the number of steps (once a minimum number of steps has been reached, corresponding to the threshold for unblocking the function).

At the same time, an advice can also be provided to the user each time the user wins digital time (i.e. unlocks an additional function): this advice explains to the user the biases that exist in his use of the screens, which can potentially be the cause of usage disorders.

When the server has granted an additional function (either by selection on a human-machine interface, or on request from an apparatus, or automatically or by other means), the server can transmit to the software module of the selected apparatus a message 72 to enable said user to access this additional function.

The message 72 may include different elements, such as in particular an identifier of the additional function, and optionally, the (second) time period allocated to access to this additional function.

The software modules are suitable for, upon reception of this message 72, permitting access to the identified additional function, during the possibly specified time period.

The access granting mechanism depends on the blocking mechanism arranged and explained hereinabove.

According to one embodiment, it is possible to provide in the system of the invention that a given user himself applies restrictions of a higher order without the intervention of the user's therapist. However, it is not possible for the user to remove these restrictions by himself.

When a user is restricted on some of his recreational applications, it often happens that the user increases his usage of other applications that are not blocked and are initially not considered as recreational, thereby following a compensation mechanism. In order to limit the effects of such a compensation mechanism, it is possible to add into the system of the invention an algorithm to limit the usage time of the initially unlocked applications, e.g. according to the formula $Tf=0.5+Mean(Ti)+1.5*Var(Ti)$, where Tf represents a daily time limit in hours for a given application and Mean(Ti), Var(Ti) correspond to the mean and variance, respectively, of the usage time of the given application during a pre-observation phase. It is thereby possible to predict in the algorithm that if Tf exceeds a predefined threshold value, the considered application is also blocked.

In some situations, it may happen that the user is no longer in touch with his therapist. In such case, a smart contract, issued at the beginning of the therapy and defining the therapy and its goals, allows the user to exit his digital therapy without the intervention of the clinician when all the conditions necessary for the end of the therapy defined by the smart contract are validated by the system according to the invention.

The smart contracts are irrevocable computer programs, most often deployed on a blockchain, that execute a set of pre-defined instructions.

The advantages of a smart contract are multiple, indeed the smart contracts allow to:

- secure an agreement between two parties (or more) due to the transparency and immutability of blockchains;
- automate the end of therapy and eliminate the risks of blocking the apparatuses in a case where the therapist is no longer available.

Of course, the present invention is not limited to the examples and to the embodiment described and shown, but is defined by the claims. In particular, the invention can have many variants accessible to a person skilled in the art.

The invention claimed is:

1. A system, comprising a hardware processor and a memory storing instructions, that when executed by the hardware processor performs operations comprising controlling a use by a user of apparatuses of a set of apparatuses having a screen, the set comprising information processing apparatuses embedding a software module and apparatuses not adapted to embed software modules and power-supplied by an electrical plug embedding a software module, and a server connected to said apparatuses by a telecommunication network, wherein:

- said apparatuses are initially restricted, at a beginning of a first time period, to a first set of functions, by means of said software modules and include means for determining behavioral information of said user and for transmitting said behavioral information to said server, and
- said server is adapted for granting an additional function among a second set of functions of said apparatuses based on said behavioral information, and for transmitting, to the software module of a selected apparatus of said set of apparatuses, a message to enable said user to access said additional function, said additional function being determined according to a degree of digital lifestyle of said user, the degree of digital lifestyle of said user representing an overall quantification of the user's use of the apparatuses with a screen of the set of apparatuses.

2. The system according to claim 1, including pre-defining activities for said user according to said degree of digital lifestyle of said user, and wherein said behavioral information is dependent on said activities.

3. The system according to claim 2, wherein said degree of digital lifestyle is established by aggregating measurements from said software modules, said measurements comprising first measurements about the behavior of the applications installed on said apparatuses, and second measurements about the behavior of said apparatuses.

4. The system according to claim 1, wherein said software modules are adapted for detecting a bypassing of the restriction by said user.

5. The system according to claim 4, adapted for checking a relevance of content of said behavioral information.

6. The system according to claim 4, wherein said software modules are adapted for checking that same are continuously in operation.

7. The system according to claim 1, wherein said additional function is limited to a second time period, shorter than said first time period.

8. The system according to claim 1, wherein said behavioral information comprises one element among a spatial movement of said user measured by an apparatus, a physical activity measured by an apparatus, the use of communication tools measured by an apparatus, the visualization of educational content measured by an apparatus, the taking of a photo measured by an apparatus, the reproduction of educational information, a validation by a third party, a validation by an external apparatus.

9. The system according to claim 1, wherein at least one software module among said set is embedded in an electrical plug supplying power to an apparatus of said set of apparatuses.

10. The system according to claim 9, wherein said software module embedded in said electrical plug is adapted for detecting a connection or a disconnection of said plug.

11. The system according to claim 1, wherein said selected apparatus or said additional function is determined by said user through a human-machine interface.

12. The system according to claim 1, wherein said additional function is determined based on a characterization of a type of behavior disorder of said user.

13. A method for controlling a use by a user of a set of apparatuses having a screen, the set comprising information processing apparatuses embedding a software module and apparatuses not adapted to embed software modules and power-supplied by an electrical plug embedding a software module, including:

arranging a set of software modules, each embedded in an apparatus of a set of apparatuses having a screen of said user, and a server connected to said apparatuses by a telecommunication network, restricting initially said apparatuses, at a beginning of a first time period, to a first set of functions, by means of said software modules, determining, by means of said software modules, behavioral information of said user and transmitting said behavioral information to said server;

and granting, by said server, an additional function among a second set of functions of said apparatuses based on said behavioral information, and transmitting, to the software module of a selected apparatus of said set of apparatuses, a message to enable said user to access said additional function, said additional function being determined according to a degree of digital lifestyle of said user, the degree of digital lifestyle of said user representing an overall quantification of the user's use of the apparatuses with a screen of the set of apparatuses.

14. The method according to claim 13, wherein the set of software modules communicate via the telecommunication network with a smart contract in which the initial restriction of said apparatuses and the degree of digital lifestyle of said user are defined, allowing each additional function to be unlocked, each software module unlocking an additional function automatically when the corresponding degree of digital lifestyle defined in the smart contract is reached by the user.

* * * * *